United States Patent
Ferguson et al.

(10) Patent No.: US 10,767,931 B2
(45) Date of Patent: Sep. 8, 2020

(54) SIDEWALL WITH BUCKSTAY FOR A METALLURGICAL FURNACE

(71) Applicant: Systems Spray-Cooled, Inc, Smyrna, TN (US)

(72) Inventors: Scott A. Ferguson, Murfreesboro, TN (US); Marina K. Temkina, Nashville, TN (US); Troy D. Ward, Franklin, TN (US)

(73) Assignee: Systems Spray-Cooled, Inc., Smyrna, TN (US)

( * ) Notice: Subject to any disclaimer, the term of this patent is extended or adjusted under 35 U.S.C. 154(b) by 318 days.

(21) Appl. No.: 15/874,483

(22) Filed: Jan. 18, 2018

(65) Prior Publication Data
US 2019/0219334 A1   Jul. 18, 2019

(51) Int. Cl.
| F27D 1/12 | (2006.01) |
| F27D 1/00 | (2006.01) |
| F27D 1/14 | (2006.01) |
| F27D 11/08 | (2006.01) |
| F27B 3/10 | (2006.01) |
| F27D 9/00 | (2006.01) |

(52) U.S. Cl.
CPC ............ *F27D 1/12* (2013.01); *F27B 3/10* (2013.01); *F27D 1/0033* (2013.01); *F27D 1/14* (2013.01); *F27D 1/145* (2013.01); *F27D 11/08* (2013.01); *F27D 2001/0079* (2013.01); *F27D 2009/0016* (2013.01)

(58) Field of Classification Search
CPC . F27D 1/12; F27D 1/0033; F27D 1/14; F27D 1/145; F27D 11/08; F27D 2001/0079; F27D 2009/0016; F27B 3/10
See application file for complete search history.

(56) References Cited

U.S. PATENT DOCUMENTS

| 2,700,375 A * | 1/1955 | Godshalk .............. F22B 37/201 122/6 A |
| 4,499,860 A | 2/1985 | Loomis et al. |
| 4,715,042 A | 12/1987 | Heggart et al. |
| 4,813,055 A | 3/1989 | Heggart et al. |
| 4,815,096 A | 3/1989 | Burwell |
| 4,849,987 A | 7/1989 | Miner, Jr. et al. |
| 5,115,184 A | 5/1992 | Arthur et al. |

(Continued)

FOREIGN PATENT DOCUMENTS

WO   WO-2015089622 A1   6/2015

OTHER PUBLICATIONS

International Search Report and Written Opinion Application No. PCT/US2018/032144, dated Oct. 16, 2018, consists of 12 pages.

*Primary Examiner* — Brian W Jennison
(74) *Attorney, Agent, or Firm* — Patterson + Sheridan, LLP (57) ABSTRACT

A sidewall for a metallurgical furnace and a metallurgical furnace having the same are described herein. In one example, a sidewall of a metallurgical furnace is provided that includes an outer wall, a hot plate and a buckstay. The hot plate is coupled in a spaced apart relation to the outer wall. The buckstay is mechanically coupled to the outer wall and the hot plate. The buckstay includes a buckstay web extending from a buckstay flange. The buckstay web includes a first end coupled to the buckstay flange, and a second end mechanically and movably coupled to the hot plate.

19 Claims, 6 Drawing Sheets

(56) References Cited

U.S. PATENT DOCUMENTS

| | | | |
|---|---|---|---|
| 5,290,016 A * | 3/1994 | Elsner | F27D 9/00 |
| | | | 266/190 |
| 5,327,453 A | 7/1994 | Arthur et al. | |
| 5,330,161 A | 7/1994 | Lehr et al. | |
| 5,444,734 A | 8/1995 | Arthur et al. | |
| 5,561,685 A | 10/1996 | Lehr et al. | |
| 5,648,981 A | 7/1997 | Miner, Jr. et al. | |
| 5,887,017 A | 3/1999 | Arthur et al. | |
| 5,999,558 A | 12/1999 | Miner, Jr. et al. | |
| 6,092,742 A | 7/2000 | Miner, Jr. et al. | |
| 6,185,242 B1 | 2/2001 | Arthur et al. | |
| 6,870,873 B2 | 3/2005 | Lyons et al. | |
| 7,452,499 B2 | 11/2008 | Arthur et al. | |
| 7,625,517 B2 | 12/2009 | Arthur et al. | |
| 2004/0069192 A1 * | 4/2004 | McCaffrey | F27B 3/16 |
| | | | 110/336 |

* cited by examiner

SIDEWALL WITH BUCKSTAY FOR A METALLURGICAL FURNACE

BACKGROUND OF THE DISCLOSURE

Field of the Disclosure

Embodiments of the present disclosure relates generally to a sidewall with one or more buckstays for a sidewall of a metallurgical furnace.

Description of the Related Art

Metallurgical furnaces (e.g., an electric arc furnace) are used in the processing of molten metal materials. The electric arc furnace heats charged metal in the furnace by means of an electric arc from a graphite electrode. The electric current from the electrode passes through the charged metal material forming a molten bath of the metal materials. The molten bath generally includes the molten material, such as steel, and slag (a byproduct of steelmaking).

A metallurgical furnace has a number of components, including a roof that is retractable, a hearth that is lined with refractory brick, and a sidewall that sits on top of the hearth. The metallurgical furnace typically rests on a tilting platform to enable the furnace to tilt about an axis. During the processing of molten materials, the furnace tilts in a first direction to remove slag through a first opening in the furnace referred to as the slag door. Tilting the furnace in the first direction is commonly referred to as "tilting to slag." The furnace must also tilt in a second direction during the processing of molten materials to remove liquid steel via a tap spout. Tilting the furnace in the second direction is commonly referred to as "tilting to tap." The second direction is generally in a direction substantially opposite the first direction.

Because of the extreme heat loads generated during the processing of molten materials within the metallurgical furnace, various types of cooling methods are used to regulate the temperature of, for example, the roof and sidewall of the furnace. One cooling method, referred to as low-pressure spray-cooling, sprays a fluid-based coolant (e.g., water) against a hot plate of a sidewall of the furnace. As the fluid-based coolant contacts the external surface of the hot plate, and the hot plate is relieved of the heat transferred to the hot plate from the molten materials within the furnace, thus regulating the temperature of the hot plate and sidewall. An evacuation system is used to continually remove spent coolant (i.e., coolant that has contacted the external surface of the hot plate) from the sidewall.

The hot plate is coupled to an outer wall of the sidewall using a buckstay to provide the structural rigidity needed to support the roof of the furnace on the sidewall and to provide a lift point for lifting the sidewall from its location on the hearth. However, as the hot plate expands and contracts relative to the attached buckstay due to heat loads, cracking of the hotplate may result because of stress caused by restraint of the hot plate expansion and contraction, which may potentially result in the failure of the sidewall to support the roof. Additionally, as the buckstay is continuously welded along the entire surface of the hot plate, the buckstay acts as a dam that prevents coolant from distributing freely across the hot plate. And particularly when the furnace is tilted, the buckstay may cause areas of the hot plate to be starved of coolant, resulting in overheating and damage to hot plate.

Therefore, there is a need for an improvement to the furnace sidewall.

SUMMARY

A sidewall of a metallurgical furnace and a metallurgical furnace are described herein. In one example, a sidewall of a metallurgical furnace is provided. The sidewall includes an outer wall, a hot plate and multiple buckstays. The hot plate is coupled in a spaced apart relation to the outer wall. The buckstay is mechanically coupled to the outer wall and the hot plate. The buckstay includes a buckstay web extending from a buckstay flange. The buckstay web includes a first end coupled to the buckstay flange, and a second end mechanically and movably coupled to the hot plate.

In another example, a spray-cooled metallurgical furnace is provided. The metallurgical furnace includes a body and a roof. The body has a hearth lined with refractory brick. The roof is disposed on a top flange of the sidewall. The sidewall includes an outer wall, a hot plate and multiple buckstays. A buckstay is mechanically coupled to the outer wall and the hot plate. The buckstay includes a buckstay flange and a buckstay web extending from the buckstay flange. The buckstay web includes a first end coupled to the buckstay flange, and a second end mechanically coupled to the hot plate. At least a portion of the second end of the buckstay web is spaced from the hot plate to allow coolant present on the hot plate to flow between the second end of the buckstay web and the hot plate.

In yet another example, a method for fabricating a sidewall of a metallurgical furnace is provided that includes coupling a buckstay in a spaced apart relation to a hot plate of a metallurgical furnace sidewall, and coupling the buckstay to an outer wall of the metallurgical furnace sidewall.

BRIEF DESCRIPTION OF THE DRAWINGS

So that the way the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present invention is directed to a metallurgical electric arc furnace having a sidewall. In one embodiment, the sidewall has an outer wall and a hot plate having a bracket affixed thereto, and a buckstay mechanically coupled to the outer wall and the hot plate. The buckstay includes a buckstay flange and a buckstay web extending from the buckstay flange. The buckstay web includes a first end coupled to the buckstay flange and a second end second end mechanically coupled to the hot plate. The second end is movably fastened to the bracket. Since the buckstay is moveably fastened to the hot plate, the outer wall is also moveable relative to the hot plate, thus allowing the mechanical integrity of the sidewall to be maintained even after many thermal cycles. Moreover, as the buckstay is spaced separate to the hot plate, coolant present on the hot plate is not blocked by the buckstay from flowing freely across the hot plate. Thus, spray cooling of the hot plate is more effective, particularly when the furnace is tilted due to the flow of coolant between the buckstay and hot plate. Additionally, the spacing reduces the amount of heat transfer between the hot plate and the outer wall, thus making the outer wall cooler to the touch while making temperature regulating within the furnace more efficient as compared to conventional designs.

Figure 1:
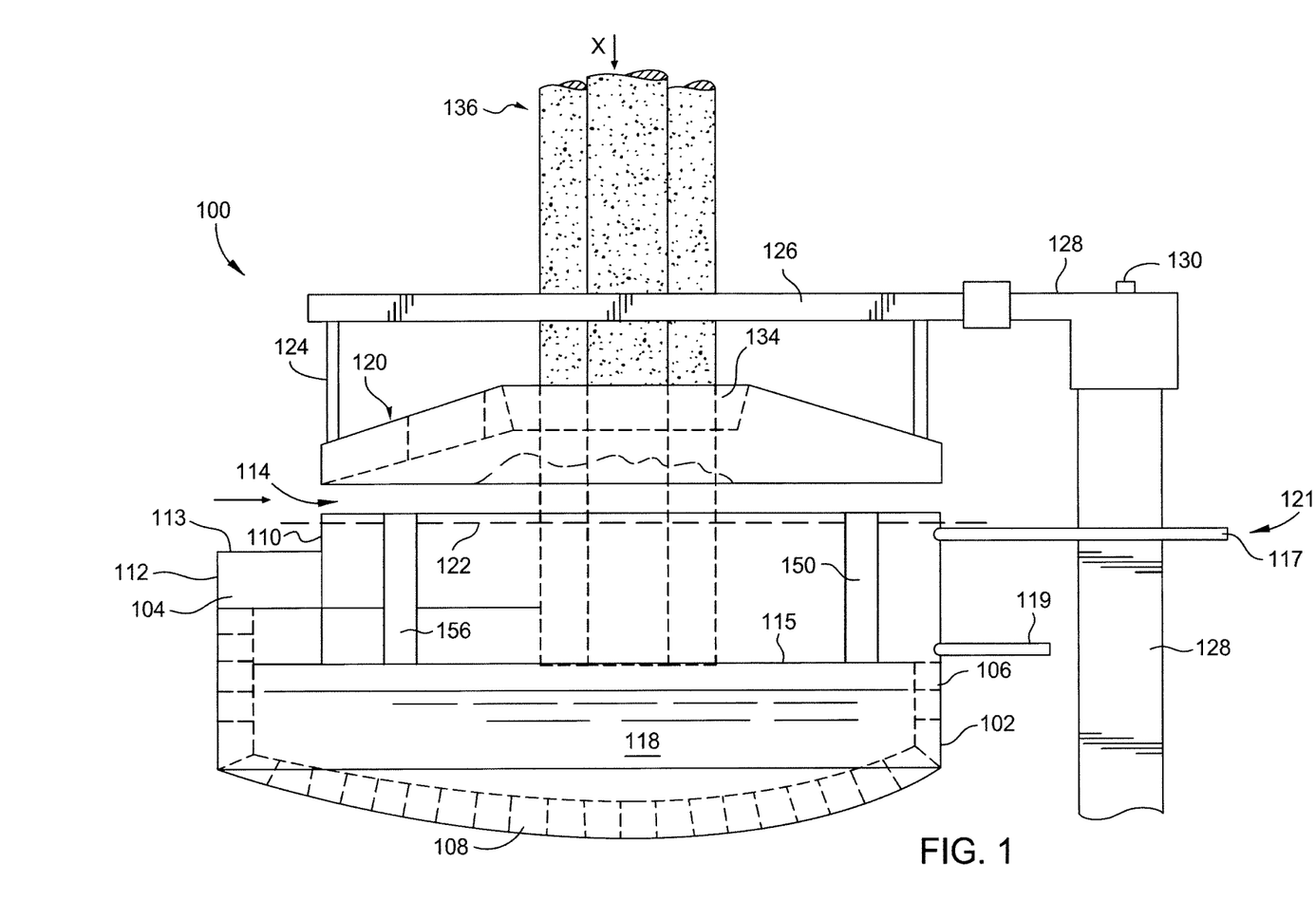
FIG. 1 illustrates an elevational side view of a metallurgical furnace.

FIG. 1 illustrates an elevational side view of a metallurgical furnace 100. The metallurgical furnace 100 has a body 102 and a roof 120. The roof 120 is supported on a sidewall 110 of the body 102. The body 102 may be generally cylindrical in shape but with an elliptical bottom. The body 102 additionally includes a step up 104 to the tap side that extends outward from a main cylindrical portion of the body 102. The step up 104 includes a sidewall 112 (which can be consider part of the sidewall 110) and a cover 113.

The body 102, including the step up 104, has a hearth 106 that is lined with refractory brick 108. Sidewalls 110, 112 are disposed on top of the hearth 106. The sidewall 110 has a top flange 114 and a bottom flange 115. The roof 120 is moveably disposed on the top flange 114 of the sidewall 110. The bottom flange 115 of the sidewall 110 is removably disposed on the hearth 106.

A spray cooling system 121 is utilized to control the temperature of sidewall 110. The spray cooling system 121 has an input cooling port 117 for introducing coolant into the sidewall 110 and a drain port 119 for emptying spent coolant from the sidewall 110. Further details of the spray cooling system 121 are discussed further below.

The body 102 generally surrounds an interior volume 116 (shown in FIG. 2) of the metallurgical furnace 100. The interior volume 116 may be loaded or charged with molten material 118, e.g., metal, scrap metal, or other meltable material, which is to be melted within the hearth 106 of the metallurgical furnace 100.

The metallurgical furnace 100, including the body 102 and the roof 120, is rotatable along a tilt axis 122 about which the metallurgical furnace 100 can tilt. The metallurgical furnace 100 may be tilted in a first direction about the tilt axis 122 toward the slag door (not shown) multiple times during a single batch melting process, sometimes referred to as a "heat", to remove slag. Similarly, the metallurgical furnace 100 may be tilted in a second direction about the tilt axis 122 towards a tap spout (not shown) multiple times during a single batch melting process including one final time to remove the molten material 118.

Roof lift members 124 may be attached at a first end to the roof 120. The roof lift members 124 may by chains, cables, ridged supports, or other suitable mechanisms for supporting the roof 120. The roof lift members 124 may be attached at a second end to one or more mast arms 126. The mast arms 126 extend horizontally and spread outward from a mast support 128. The mast support 128 may be supported by a mast post 130. The mast support 128 may rotate about the mast post 130. Alternately, the mast post 130 may rotate with the mast support 128 for moving the roof lift members 124. In yet other examples, roof lift members 124 may be aerially supported to move the roof 120. In one embodiment, the roof 120 is configured to swing or lift away from the sidewall 110. The roof 120 is lifted away from the sidewall 110 to expose the interior volume 116 of the metallurgical furnace 100 through the top flange 114 of the sidewall 110 for loading material therein.

The roof 120 may be circular in shape. A central opening 134 may be formed through the roof 120. Electrodes 136 extend through the central opening 134 from a position above the roof 120 into the interior volume 116. During operation of the metallurgical furnace 100, the electrodes 136 are lowered through the central opening 134 into the interior volume 116 of the metallurgical furnace 100 to provide electric arc-generated heat to melt the material 118. The roof 120 may further include an exhaust port to permit removal of fumes generated within the interior volume 116 of the metallurgical furnace 100 during operation.

Figure 2:
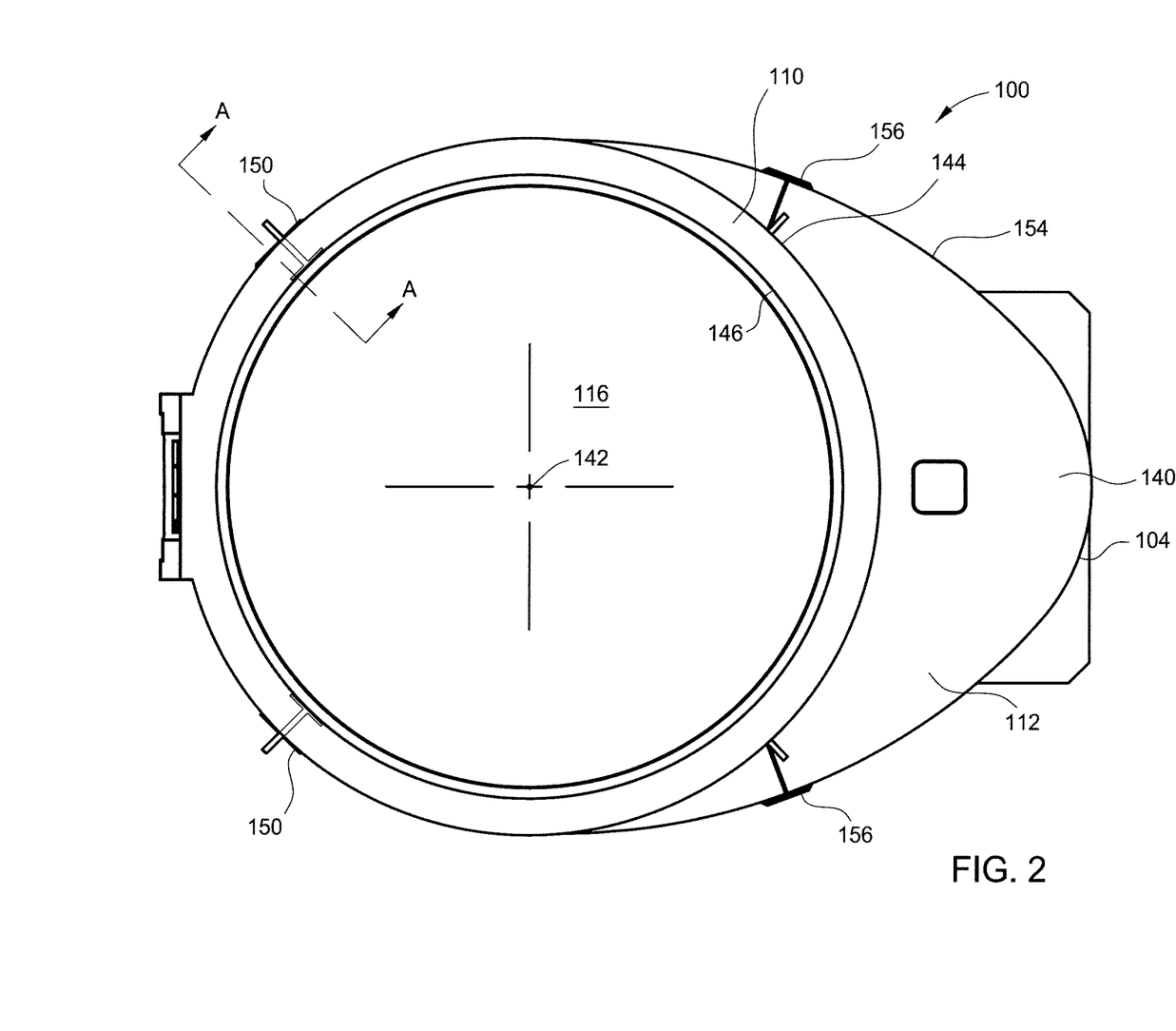
FIG. 2 illustrates a top plan view of the metallurgical furnace of FIG. 1 with the roof and the cover removed.

FIG. 2 illustrates a top plan view of the metallurgical furnace 100 with the roof 120 removed. Referring to FIGS. 1 and 2, the sidewall 110 of the metallurgical furnace 100 has an outer wall 144 and a hot plate 146. The outer wall 144 is spaced outward of the hot plate 146 relative to a center axis 142 of the body 102. The side of the hot plate 146 facing away from the outer wall 144 and towards the center axis 142 is exposed to the interior volume 116 of the metallurgical furnace 100. In one example, the hot plate 146 is concentric with the outer wall 144 of the sidewall 110 about the center axis 142 of the body 102. A plurality of tall buckstays 150 are distributed about the outer wall 144 and the hot plate 146 and separate the hot plate 146 from the outer wall 144 of the sidewall 110 of the metallurgical furnace 100.

The step up 104 of the metallurgical furnace 100 has a sidewall 112 including an outer wall 154. A second plurality of short buckstays 156 is distributed about the outer wall 154 of the step up 104 to the hot plate 146 of the sidewall 110 of the metallurgical furnace 100.

The buckstays 150, 156 couple to the outer wall 144, 154 to the hot plate 146, thus significantly increasing the buckling resistance of the sidewall 110, thereby allowing the roof 120 to be safely supported by the body 102.

Figure 3:
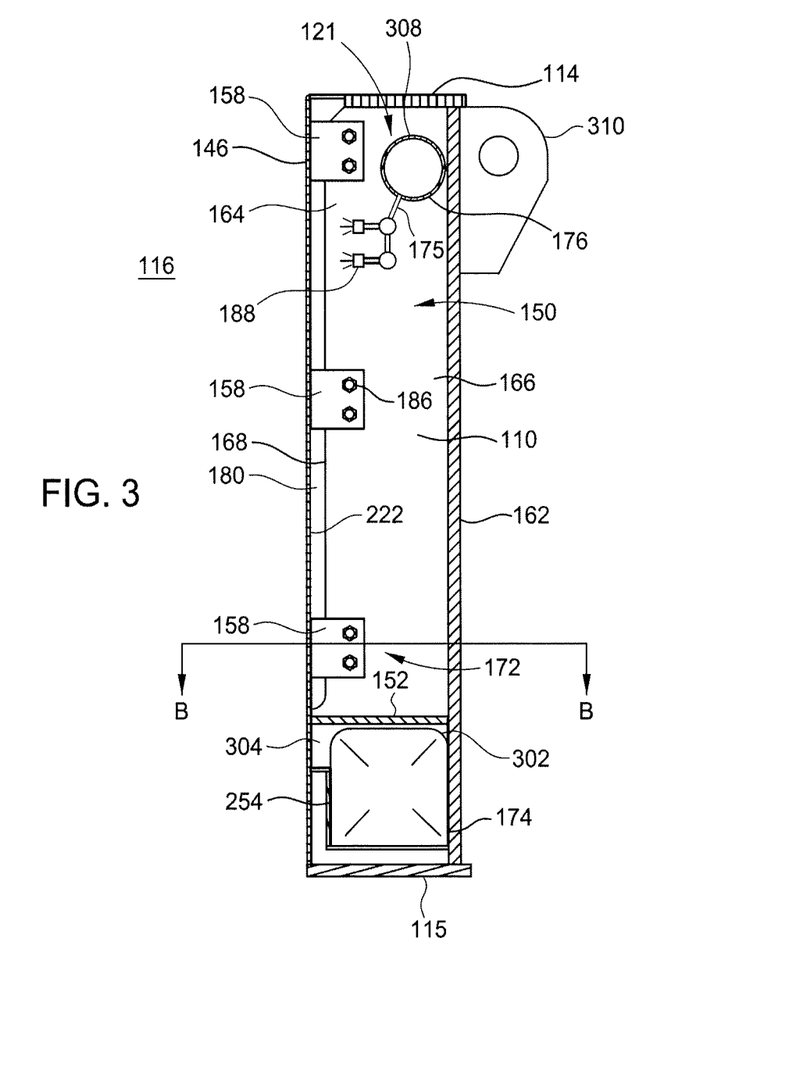
FIG. 3 is a sectional elevation view of the sidewall of the metallurgical furnace of FIG. 1 taken along section line A-A illustrated in FIG. 2.
Figure 4:
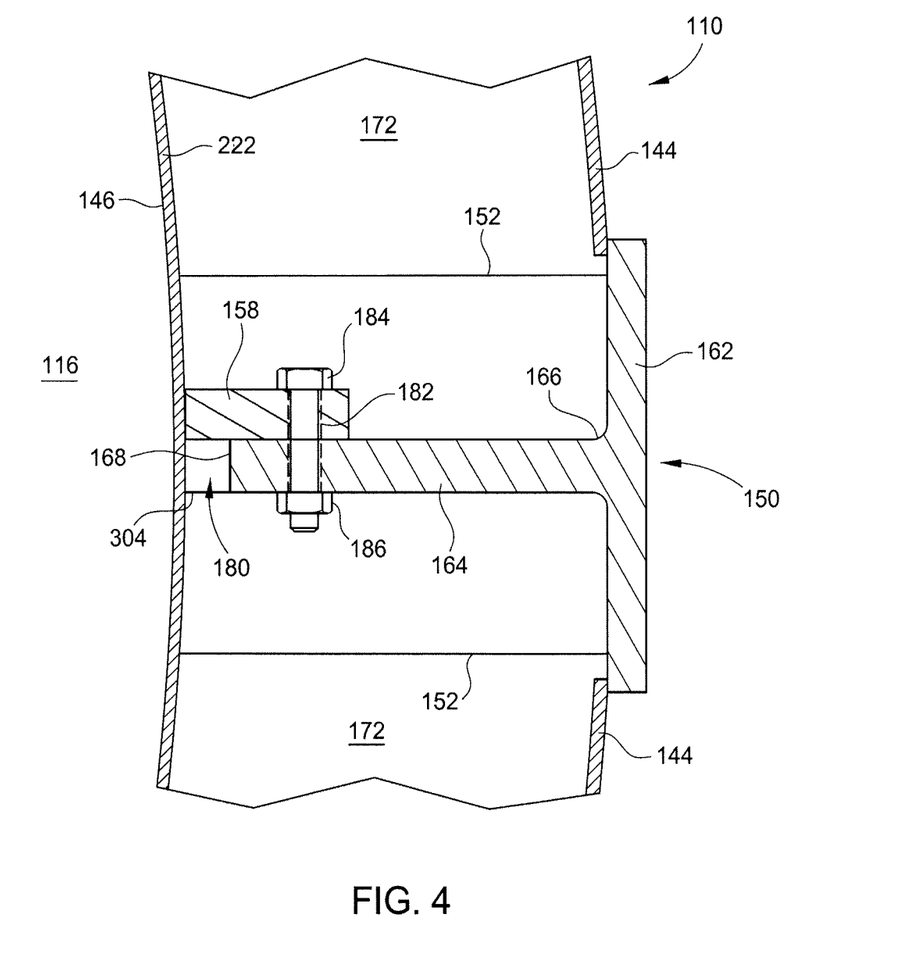
FIG. 4 is a sectional view of the sidewall of the metallurgical furnace of FIG. 1 taken along the line B-B illustrated in FIG. 3.

FIG. 3 illustrates a sectional elevation view of the sidewall 110 of the metallurgical furnace 100 taken along section line A-A of FIG. 2. FIG. 4 illustrates a sectional view of the sidewall 110 of the metallurgical furnace 100 taken along section line B-B of FIG. 3. The sidewall 110 includes the outer wall 144 and the hot plate 146. The hot plate 146 has one or more brackets 158 affixed thereto. The brackets 158 provide a mounting point for movably affixing the tall buckstay 150 to the hot plate 146. That is, brackets 158 permit affixing the tall buckstay 150 to the hot plate 146 in a manner that allows some degree of relative motion through the mounting interface. Thus, the buckstay 150 mechanically couple the outer wall 144 and the hot plate 146 in a manner that allows the hot plate 146 to move relative to the outer wall 144 without comprising the mechanical integrity and strength of the sidewall 110. In one example, the brackets 158 are welded to the hot plate 146 and fastened to the buckstay 150.

The tall buckstay 150 includes a buckstay flange 162 and a buckstay web 164 extending inward from the buckstay flange 162. The tall buckstay 150 may also include a lift point 310 for use when moving and installing the sidewall 110. In one example, the buckstay web 164 extends perpendicularly from the buckstay flange 162 towards the hot plate 146. In another example, the buckstay web 164 has an oblique orientation relative to the buckstay flange 162. In an example, the buckstay flange 162 is oriented quasi-tangentially parallel to the hot plate 146.

The buckstay web 164 includes a first end 166 mechanically coupled to the buckstay flange 162 and a second end 168 mechanically coupled to the hot plate 146. The buckstay flange 162 may be mechanically coupled to the sidewall 110 in any suitable manner. In the example depicted in FIG. 3, the buckstay flange 162 continuously welded to the sidewall 110.

The top flange 114 and bottom flange 115 of the sidewall 110 are also mechanically coupled to the buckstay flange 162 and, optionally also, to the buckstay web 164. The top flange 114 and bottom flange 115 of the sidewall 110 are also mechanically coupled to the outer wall 144 and hot plate 146. Thus, the top flange 114, the bottom flange 115, the buckstay flange 162, the buckstay web 164, the outer wall 144 and hot plate 146 being secured together as a unitary structure provides the rigidity, hoop and compressive strength to the sidewall 110.

To further strengthen the sidewall 110, at least one interior flange 152 is mechanically coupled to the buckstay web 164, the outer wall 144 and the hot plate 146 at a location between the top flange 114 and bottom flange 115 of the sidewall 110. In one example, the interior flange 152 is located adjacent the passage 302 formed through the buckstay web 164 to compensate for the loss of material and strength of the buckstay web 164 due to the presence of the passage 302. The flange 152 may have an orientation that is perpendicular to the plane of the buckstay web 164. A single flange 152 may utilized on one side of the buckstay web 164, or two flanges 152 may utilized one on either side of the buckstay web 164.

The hot plate 146 and the outer wall 144 form an enclosure 172 within the sidewall 110. The spray cooling system 121 is disposed in the enclosure 172 and includes a plurality of spray nozzles 188 and a header conduit 176 located within the enclosure 172. The header conduit 176 is coupled to the input cooling port 117 (shown in FIG. 1) and is configured to distribute coolant within the enclosure 172 to various tubings 175 that coupled the nozzles 188 to the header conduit 176. The header conduit 176 may pass through a hole 308 formed through the buckstay web 164. The nozzles 188 are positioned to spray coolant on an inner side 222 of the hot plate 146, thus maintaining the temperature of the hot plate 146 below a desired temperature. A trough 174 is disposed in the enclosure 172 proximate the bottom flange 115 for receiving spent coolant sprayed from the nozzles 188. The trough 174 generally passes through or under the buckstay web 164, and is coupled to the drain port 119 for emptying spent coolant from the sidewalls 110.

Returning to the buckstay 150, the second end 168 of the buckstay web 164 is movably fastened to one or more brackets 158. That is, the second end 168 of the buckstay web 164 is fastened to the brackets 158 in a manner that allows relative motion between the second end 168 and the brackets 158, and thus, allows relative motion between the hot plate 146 and outer wall 144. The buckstay web 164 is sized and shaped to form a gap 180 between the hot plate 146 and the buckstay web 164 to provide space for expansion and contraction of the hot plate 146 relative to the outer wall 144 without threatening the structural integrity of the sidewall 110. The bracket 158 has a hole 182 formed therethrough for accepting a fastener that engages the second end 168 of the buckstay web 164, thereby affixing the buckstay 150 to the bracket 158. In one example, the second end 168 of the buckstay web 164 is fastened through the hole 182 in the bracket 158 with a bolt 184 and a nut 186. In another example, the second end 168 of the buckstay web 164 is fastened through the hole 182 to the bracket 158 with a rivet (not shown) or other suitable fastening technique. The use of a fastener, such as the nut 186 and bolt 184, allows some movement between the bracket 158 and buckstay 150, thus permitting some relative motion between the hot plate 146 and outer wall 144 that is not permitted by welds.

Additionally, the gap 180 provides a thermal break between the hot plate 146 and outer wall 144 that significantly reduces the amount of heat transferred from the hot plate 146 to the outer wall 144. The reduction of heat transfer further reduces the stress around the buckstay 150, while making temperature control of the outer wall 144 low and safer to touch.

The gap 180 additionally allows free and unrestricted flow of coolant between the buckstay web 164 and the hot plate 146. Thus, particularly as the furnace 100 is tilted during operation, the gap 180 prevents the buckstay web 164 from becoming a dam which could prevent the flow of coolant from effectively cooling portions of the hot plate 146 adjacent the buckstay web 164. Consequently, the gap 180 ensures good and effective distribution of coolant even during tilting of the furnace 100 which advantageously maintains the hot plate 146 from exceeding design temperatures and extending the surface life of the hot plate 146.

In an example, the step up 104 shares the same hot plate 146 as the body 102 or may have a separate hot plate welded to the hot plate 146 to form a single hot plate assembly bounding the interior volume 116 of the metallurgical furnace 100.

Figure 5:
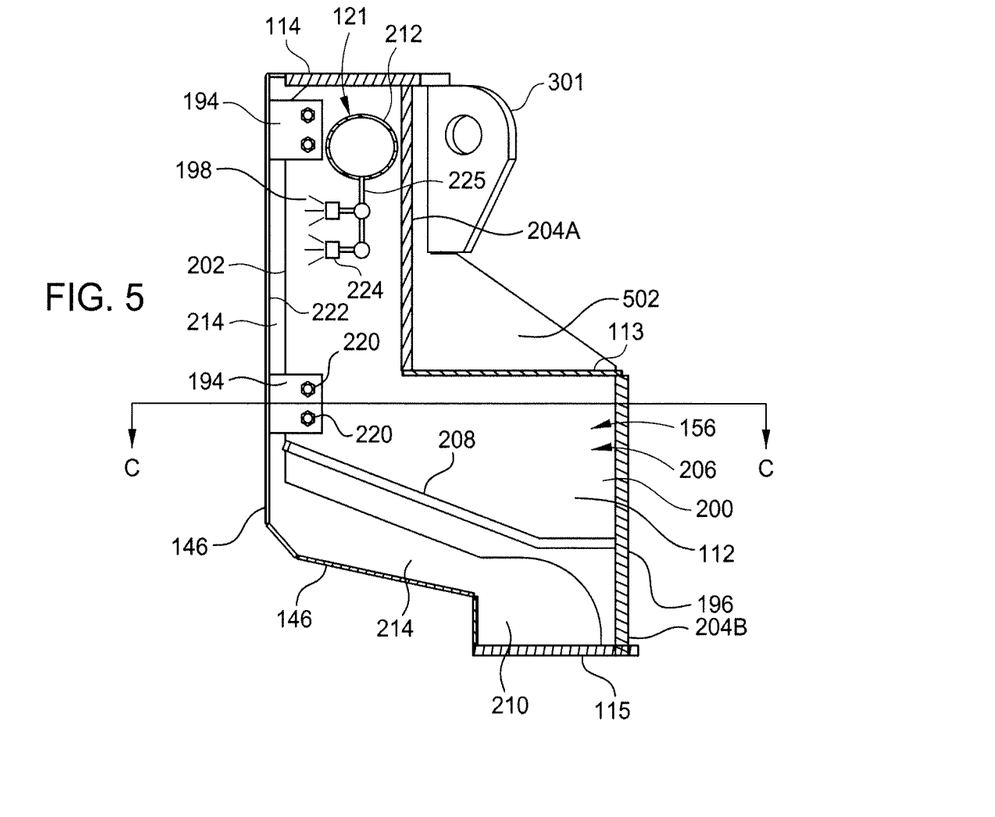
FIG. 5 illustrates an elevation view at the step up to the tap side of the sidewall of the metallurgical furnace of FIG. 1.
Figure 6:
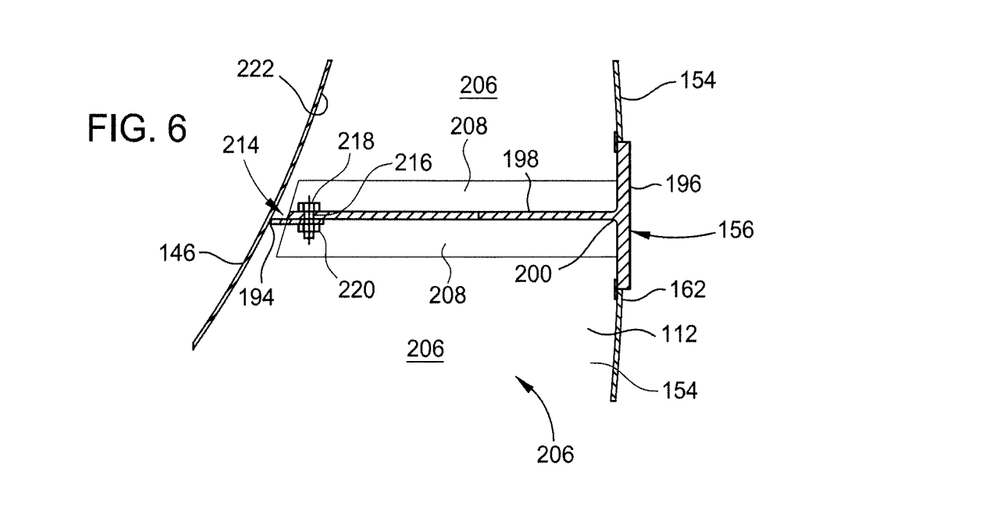
FIG. 6 illustrates a sectional view of the sidewall of the lip of the metallurgical furnace of FIG. 1 taken along the line C-C illustrated in FIG. 5.

FIG. 5 illustrates an elevation view of the sidewall 112 of the step up 104 of the metallurgical furnace 100. FIG. 6 illustrates a sectional view of the sidewall 112 of the step up 104 of the metallurgical furnace 100 taken along the section line C-C of FIG. 5. The sidewall 112 includes the outer wall 154 and the hot plate 146. The portion of the hot plate 146 disposed in the step up 104 is spaced at a varying distance from the outer wall 154. The short buckstays 156 extend from the outer wall 154 of the step up 104 to the hot plate 146 of the sidewall 110 of the metallurgical furnace 100.

The hot plate 146 is mechanically coupled to one or more brackets 194 affixed thereto. The sidewall 112 also includes a short buckstay 156 mechanically coupled to the outer wall 154 and further extending inward to the hot plate 146. The short buckstay 156 includes a buckstay flange 196 and a buckstay web 198, extending inward from the buckstay flange 196. The buckstay flange 196 may include a first portion 204A and a second portion 204B. The first portion 204A is generally closer to the center axis 142 relative to the second portion 204B. The first portion 204A may be separated from the second portion 204B by the cover 113, and is coupled together via the buckstay web 198. A lift point 310 may be coupled to or integrated with the buckstay flange 196 to facility lifting the body 102.

The buckstay web 198 includes a first end 200 mechanically coupled to the buckstay flange 196 and a second end 202 mechanically coupled to the hot plate 146. The second end 202 of the buckstay web 198 is spaced from the hot plate 146 to form a gap 214 therebetween.

As with the buckstay 150, the buckstay 156 may be coupled to the top 114 and bottom 115 of the sidewall 112. In an example, the buckstay 156 also includes an interior flange 208 that functions as a stiffener. In one example, the interior flange 208 is located adjacent a trough 210 formed through or below the buckstay web 198 to compensate for the loss of material and strength of the buckstay web 198 due to the presence of the trough 210. The flange 208 may have an orientation that is perpendicular to the plane of the buckstay web 198. A single flange 208 may utilized on one side of the buckstay web 198, or two flanges 208 may utilized one on either side of the buckstay web 198.

The second end 202 of the buckstay web 198 is movably fastened to one or more brackets 194. That is, the second end 202 is fastened to the brackets 194 in a manner that allows motion between the second end 202 and the brackets 194, such as described above with reference to the tall buckstay 150. In one example, the one or more brackets 194 may be welded to the hot plate 146 while the buckstay web 198 is fastened to the brackets 194. The buckstay web 198 is sized and shaped to form a gap 214 between the hot plate 146 and the buckstay web 198 to provide for expansion and contraction of the hot plate 146. The bracket 194 has a hole 216 therein for fastening the second end 202 of the buckstay web 198 to the bracket 194. In one example, the second end 202 of the buckstay web 198 is fastened through the hole 216 in the bracket 194 with a bolt 218 and a nut 220. In another example, the second end 202 of the buckstay web 198 is fastened through the hole 216 to the bracket 194 with a rivet (not shown).

The gap 214 present between the buckstay web 198 and the hot plate 146 permits some degree of movement among the outer wall 154, the buckstay web 198, the bracket 194, and the hot plate 146, allowing the hot plate 146 to expand and contract during operation of the furnace 100 without threatening the mechanical and the structural integrity of the sidewalls 110, 112. Moreover, as discussed above, the gap 214 additionally allows free and unrestricted flow of coolant between the buckstay web 198 and the hot plate 146. Thus, particularly as the furnace 100 is tilted during operation, the gap 214 effectively ensures good and effective distribution of coolant even during tilting of the furnace 100 which advantageously maintains the hot plate 146 from exceeding design temperatures and extending the surface life of the hot plate 146.

In one example, the buckstay web 164 extends perpendicularly from the buckstay flange 162. In another example, the buckstay web 198 extends at an acute angle from the buckstay flange 196. In an example, the buckstay flange 198 extends at an angle to the hot plate 146.

In an example, one or more spray nozzles 224 of the spray cooling system 121 located within an enclosure 206 defined between the hot plate 146 and outer wall 154. The spray nozzles 224 are configured to spray coolant on an inner side 222 of the hot plate 146. The one or more spray nozzles 224 are further configured to receive coolant through tubing 225 from a liquid coolant supply header conduit 212 routed through the enclosure 206. The liquid coolant supply header conduit 212 may be coupled to the liquid coolant supply header conduit 176, or separately coupled to the input cooling port 117.

A coolant supply (not shown) is coupled to the input cooling port 117 and provides coolant to the spray cooling system 121 interfaced with the sidewalls 110, 112 of the metallurgical furnace 100. The coolant, such as water or other suitable fluid, is provided through the port 117 to the liquid coolant supply header conduits 176, 212. From the liquid coolant supply header conduits 176, 212, coolant is provided through the tubing 175, 225 to the nozzles 188, 224. The nozzles 188, 224 are configured to spray the coolant on the inner surface 222 of the hot plate 146. The coolant sprayed on the inner surface 222 of the sidewalls 110, 112 maintains the hot plate 146 below a maximum operating temperature to prevent damage to the hot plate 146 of the sidewalls 110, 112.

The sidewalls 110, 112 include troughs 174, 210 that collect coolant spray from the one or more spray nozzles 188, 224 in the enclosures 172, 206 onto the inner surface 222 of the hot plate 146 of the sidewalls 110, 112. As shown in FIGS. 3 and 5, the troughs 174, 210 allow fluid to pass through the buckstays 150, 156 so that the coolant sprayed on the inner surface 222 of the hot plate 146 may be readily collected and evacuated from the sidewalls 110, 112 through the drain port 119.

In the embodiment illustrated in FIGS. 3 and 5, the portion of the spray cooling system 121 includes the liquid coolant supply header conduits 176, 212, tubing 175, 225, a plurality spray nozzles 188, 224, the enclosures 172, 206, and the troughs 174, 210. The supply header conduits 176, 212 are fluidly coupled to the tubing 175, 225. Coolant flows into the liquid coolant supply header conduits 176, 212, through the tubing 175, 225, the one or more spray nozzles 188, 224, and thence onto the hot plate 146 for cooling the hot plate 146. The coolant then drains through the troughs 174, 210.

An evacuation system (not shown) removes the sprayed (i.e., spent) coolant from the enclosures 172, 206 through the drain port 119 that is connected to the one or more troughs 174, 210 that collect the coolant sprayed in the enclosures 172, 206 by the spray cooling system 121. Evacuation is by gravity unless surrounding constraints do not permit gravity drainage. An alternative evacuation system includes one or more pumps or vacuum systems suitable for removing sprayed coolant from troughs 174, 210 during operation of the furnace 100.

As illustrated in FIG. 3, a passage 302 is formed through the buckstay web 164 to allow passage of the trough 174. Since the passage 302 is large relative to the width of the buckstay web 164, a strip 304 of the buckstay web 164 defined between the passage 302 and the hot plate 146 which forms a portion of the second end 168 is welded to the hot plate 146 to improve the mechanical integrity of the buckstay web 164 in the region adjacent the passage 302.

Additionally, as shown in FIGS. 3 and 5, the location of the troughs 174, 210 is immediately proximate the flanges 152, 208. The location of the troughs 174, 210 immediately proximate the flanges 152, 208 ensures that the spent coolant will always be allowed to run by gravity to one of the troughs 174, 210 so that evacuation by gravity is an option or the pumps of the evacuation system utilized to empty the troughs 174, 210 will remain functioning to drain the coolant from the sidewalls 110, 112 even when the furnace 100 tilts during operation.

Figure 7:
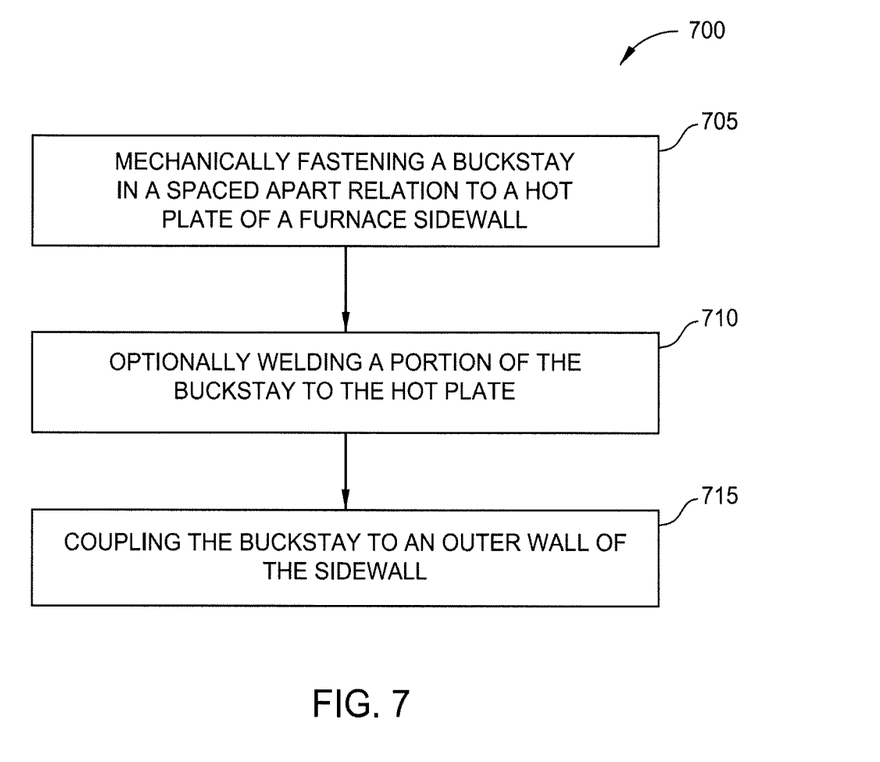
FIG. 7 illustrates an example of a method for installing a buckstay in a sidewall of a metallurgical furnace.

FIG. 7 illustrates an example of a method 700 for installing a buckstay in a sidewall of a metallurgical furnace 100. At operation 705, a buckstay is fastened in a spaced apart relation to a hot plate of a sidewall of metallurgical furnace. In one example, an edge of a web of the buckstay is fastened to a bracket welded to the hot plate. The spaced apart relation of the hot plate to the buckstay is sufficient to allow substantially unimpeded flow of coolant through the gap defined between the buckstay and hot plate. At optional operation 710, a portion of the buckstay may be welded to the hot plate. For example, a portion of the buckstay proximate the trough utilized to remove coolant may be welded to the hot plate to increase the strength of the sidewall in that region. At operation 715, the buckstay is coupled to an outer wall of the sidewall.

While the foregoing is directed to embodiments of the present disclosure, other and further embodiments may be devised without departing from the basic scope thereof, and the scope thereof is determined by the claims that follow.

What is claimed is:

1. A sidewall of a metallurgical furnace, comprising:
an outer wall;
a hot plate coupled in a spaced apart relation to the outer wall; and
a buckstay mechanically coupled to the outer wall and the hot plate, the buckstay comprising:
  a buckstay flange and
  a buckstay web extending from the buckstay flange, the buckstay web comprising:
    a first end coupled to the buckstay flange; and
    a second end mechanically and movably coupled to the hot plate, wherein the buckstay web is spaced from the hot plate to define a qap between the hot plate and the buckstay web sufficient to allow coolant to freely flow between the hot plate and the buckstay web.

2. The sidewall of claim 1 further comprising:
a bracket welded to the hot plate, the buckstay web moveably coupled to the bracket.

3. The sidewall of claim 2, wherein the second end of the buckstay web is fastened to the bracket by a fastener.

4. The sidewall of claim 1, wherein a portion of the buckstay web is welded to the hot plate.

5. The sidewall of claim 4 further comprising:
an interior flange coupled to the buckstay web adjacent the portion of the buckstay web welded to the hot plate; and
a trough formed through or under the buckstay web, and below the interior flange.

6. The sidewall of claim 1, wherein the buckstay flange extends tangentially to or concentric with the outer wall.

7. The sidewall of claim 1 further comprising:
a plurality of spray nozzles positioned to spay coolant on an inner side of the hot plate.

8. The sidewall of claim 1 further comprising:
a trough for receiving spent coolant disposed through or under the buckstay.

9. A spray-cooled metallurgical furnace, comprising:
a body having a bottom section including a hearth lined with refractory brick and a sidewall; and
a roof disposed on a top flange of the sidewall, wherein the sidewall comprises:
an outer wall;
a hot plate; and
a buckstay mechanically coupled to the outer wall and the hot plate, the buckstay comprising:
  a buckstay flange and
  a buckstay web extending from the buckstay flange, the buckstay web comprising:
    a first end coupled to the buckstay flange; and
    a second end mechanically coupled to the hot plate, wherein at least a portion of the second end of the buckstay web is spaced from the hot plate to allow coolant present on the hot plate to flow between the second end of the buckstay web and the hot plate.

10. The metallurgical furnace of claim 9 further comprising:
a fastener moveably coupling a bracket welded to the hot plate to the second end of the buckstay web.

11. The metallurgical furnace of claim 10, wherein the bracket is welded to the hot plate.

12. The metallurgical furnace of claim 9, wherein a portion of the buckstay web is welded the hot plate in a region of the buckstay web through which a coolant drainage trough is formed.

13. The metallurgical furnace of claim 9, wherein the buckstay web extends perpendicularly from the buckstay flange.

14. The metallurgical furnace of claim 9, wherein the buckstay web is oblique to the buckstay flange.

15. The metallurgical furnace of claim 9, wherein the buckstay flange extends tangentially to or concentric with the outer wall.

16. The metallurgical furnace of claim 9 further comprising:
one or more spray nozzles configured to spay coolant on an inner side of the hot plate.

17. The metallurgical furnace of claim 9 further comprising:
a trough for receiving spent coolant at an end of the sidewall.

18. A method for fabricating a sidewall of a metallurgical furnace, comprising:
coupling a buckstay in a spaced apart relation to a hot plate of a metallurgical furnace sidewall; and
coupling the buckstay to an outer wall of the metallurgical furnace sidewall.

19. The method of claim 18 wherein coupling the buckstay to the hot plate comprises:
fastening a portion of the buckstay in a spaced apart relation to the hot plate; and
welding a strip of the buckstay proximate a coolant drainage trough formed through the buckstay to the hot plate.

* * * * *